(12) United States Patent
Livernais

(10) Patent No.: US 8,400,032 B2
(45) Date of Patent: Mar. 19, 2013

(54) INERTIA WHEEL WITH PROGRESSIVE RUN UP

(75) Inventor: Daniel Livernais, Vescemont (FR)

(73) Assignee: General Electric Company, Schenectady, NY (US)

( * ) Notice: Subject to any disclaimer, the term of this patent is extended or adjusted under 35 U.S.C. 154(b) by 292 days.

(21) Appl. No.: 12/670,387

(22) PCT Filed: Jul. 25, 2008

(86) PCT No.: PCT/EP2008/059827
§ 371 (c)(1),
(2), (4) Date: Jul. 12, 2010

(87) PCT Pub. No.: WO2009/016128
PCT Pub. Date: Feb. 5, 2009

(65) Prior Publication Data
US 2011/0023448 A1  Feb. 3, 2011

(30) Foreign Application Priority Data

Jul. 27, 2007  (FR) ...................................... 07 56774

(51) Int. Cl.
*H02K 7/02* (2006.01)
*H02K 9/06* (2006.01)
(52) U.S. Cl. ......................................................... 310/74
(58) Field of Classification Search .................. 310/74, 310/75 R, 78; 123/179.25, 179.31; 74/6
See application file for complete search history.

(56) References Cited

U.S. PATENT DOCUMENTS

| 3,599,857 A * | 8/1971 | Loyd et al. ..................... 228/2.3 |
| 4,412,457 A * | 11/1983 | Colvin et al. .................... 74/7 A |
| 4,427,909 A * | 1/1984 | Takahashi ....................... 310/74 |
| 4,556,132 A * | 12/1985 | Lengsfeld et al. ....... 192/12 BA |
| 6,568,518 B2 * | 5/2003 | Sarar ............................ 192/48.8 |

FOREIGN PATENT DOCUMENTS

| CN | 2381840 Y | 6/2000 |
| DE | 3442080 A1 | 5/1986 |
| EP | 13828170 A | 1/2004 |
| GB | 899754 A | 5/1986 |
| JP | 55137380 A | 10/1980 |
| JP | 04099995 A | 3/1992 |

OTHER PUBLICATIONS

International Search Report PCT/EP2008/059827 published with WIPO publication, on Feb. 5, 2009.
CN Office Action dated Dec. 16, 2011 from corresponding Application No. 200880100502.4, along with unofficial English translation.

* cited by examiner

*Primary Examiner* — Tran Nguyen
(74) *Attorney, Agent, or Firm* — Global Patent Operation; Mark A. Conklin

(57) ABSTRACT

A driving device for a motor 15 is disclosed, the device including an inertia wheel 16, a free wheel 18 able to ensure a unidirectional automatic clutching on a torque reversal between the inertia wheel and the shaft 12 of the motor, and a run up device 20 for the inertia wheel. The driving device is mounted on the end of shaft 12 of the motor opposite to the end for coupling the motor to mechanical equipment driven by the motor 15.

13 Claims, 1 Drawing Sheet

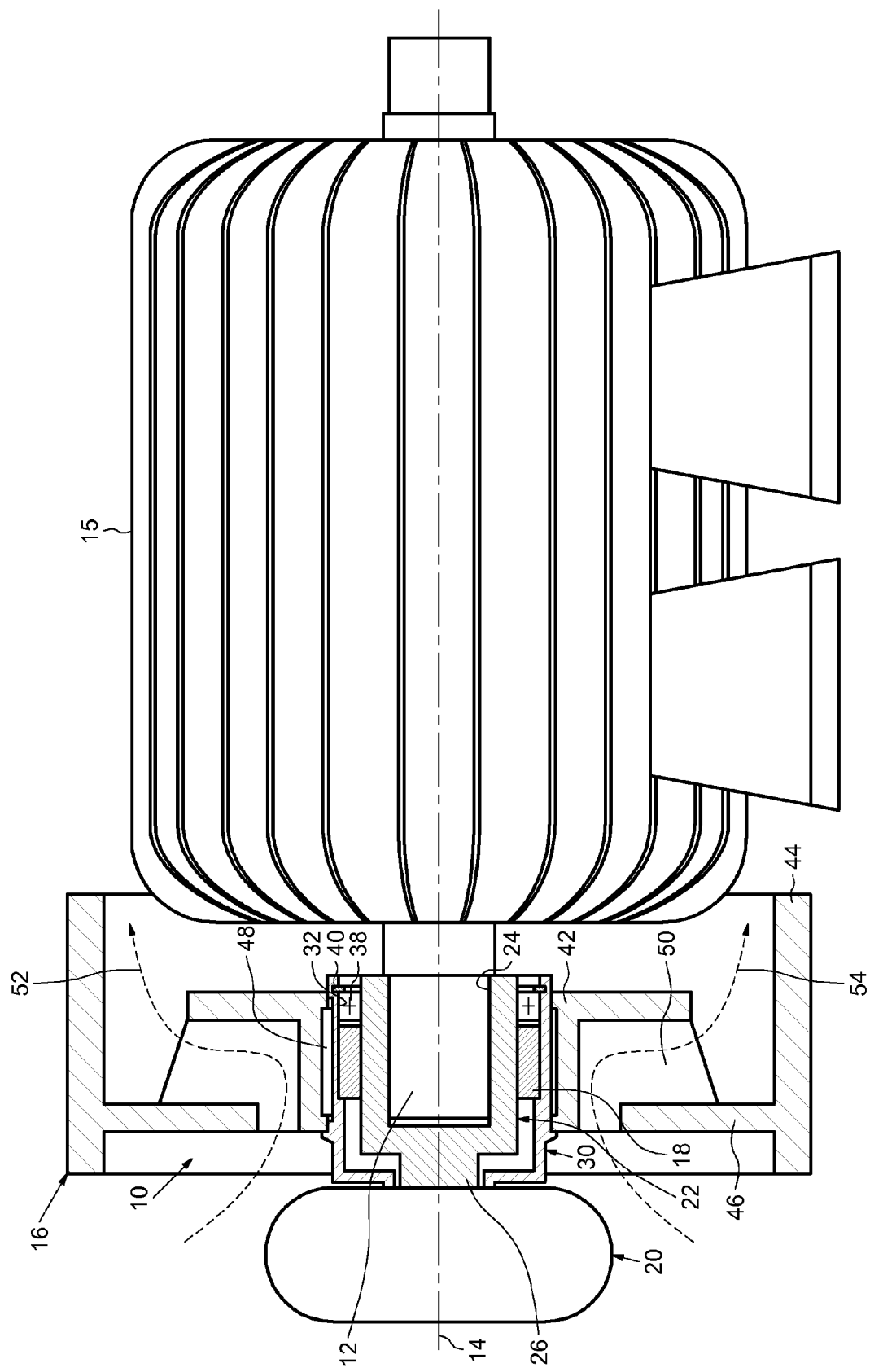

INERTIA WHEEL WITH PROGRESSIVE RUN UP

CROSS-REFERENCE TO RELATED APPLICATIONS

This is a national stage application under 35 U.S.C. §371 (c) of prior-filed, co-pending PCT patent application serial number PCT/EP08/059827, filed on 25 Jul. 2008, which claims priority to French patent application serial number 0756774, filed on 27 Jul. 2007, each of which is hereby incorporated herein by reference in its entirety.

BACKGROUND OF THE INVENTION

This invention relates to devices capable of keeping a rotating shaft on speed in the event of a transient disconnection from the electrical supply of the motor driving the said shaft.

A particularly interesting application of this invention concerns the drive of a liquid fuel pump of a combustion turbine.

Generally, in an industrial application, the accessories of the combustion turbine are electrically supplied by two different sources to avoid a common failure mode.

For reliability reasons, these two sources are not supplying the accessories at the same time so that possible feeder fault is not communicated from one source to the other, for example a voltage drop caused by an overload or a short circuit.

The transfer from one source to the other is done with a transient disconnection from the supply. This transfer from one source to the other is done automatically with a fault detection on the source in use, or by operator action, for example operation or maintenance reasons.

Such transfer done without specific precautions, can be particularly disturbing for the operation of the combustion turbines. As a matter of fact, it is mandatory to keep the supply of the high pressure liquid fuel to alleviate the risk of trip by loss of flame or to disturb the power production. For certain countries, the grid codes call for an obligation for the combustion turbine to be capable of continuing operation in the event of a power loss of 1.5 second, for example this is the case in the Netherlands.

To comply with this obligation, the use of a pneumatic accumulator having a reservoir which volume is separated by an elastic membrane with high pressure liquid fuel on one side and a pressurized neutral gas on the other side is known. This arrangement performs well on the low pressure liquid fuel side. However, the accumulator interferes in an unacceptable manner with the control of the turbine when used on for high pressure liquid fuel as it results in increased time constant. The turbine is then unable to face rapid load variations for example further to the opening of a breaker or on an isolated grid, the adjustment of the fuel flow being unable to follow accurately the load variation.

Furthermore, the filling flow of the accumulator when starting, or during the restoration of the accumulation further to a source transfer, or further to a sudden load variation of the turbine is taken off the fuel pump capacity, this affects the capability of the pump to deliver the required flow to ensure the proper operation of the turbine. This results in an extension of the transient time further to a source transfer or other disturbances.

Similarly, it is known to use a mechanical accumulator of a type having piston and cylinder assembly that provide a first chamber in which is the high pressure liquid fuel of the turbine supply and a second chamber filled with an actuating fluid.

In operation, the piston is completely pushed by the fuel pressure. In normal operation, this device has no action as the piston rests on the cylinder bottom when the storage is completed, and does not interfere with the fuel control as does the pneumatic accumulators. Following a transient disconnection from the power supply, the actuating fluid present in the accumulator causes the piston displacement, which allows for restitution of a stored fuel quantity into the turbine supply thus backing up the pump flow reduction.

This arrangement has the major drawback of being not suitable for industrial applications, for which the fuel pressure may vary continuously to cope with the operating conditions. As a matter of fact, the mechanical accumulator fuel restitution is done at the pressure it has been stored which corresponds to only a specific operating point. Thus, during a transient disconnection, a load variation is observed as big as the difference between the storage conditions and the operating conditions prevailing at the event time.

THE BRIEF DESCRIPTION OF THE INVENTION

An aim of the present invention, is to overcome the disadvantages described above linked with the fuel storage.

More particularly, the invention is to provide a device that can continue to drive the pump and allow for continuous high pressure fuel supply to a combustion turbine during a transient disconnection of the electrical motor from the supply, and in a manner particularly fast, efficient and economical manner and with a reduce foot print.

Another aim of the proposed invention is to provide a device that does not impact the starting time of the motor pump assembly. This property is indeed necessary to ensure a fast and efficient lead lag between redundant pumps further to a fault on the lead pump.

A further aim of the invention is to provide a device that does not interferes hydraulically with the fluids supplying for the turbine supply, in order not to increase the time constant of the control loops.

The present invention provides a device for back up driving of a of a motor (15), comprising an inertia wheel (16), a unidirectional clutch (18) which is automatically engagable in the event of reverse torque between the inertia wheel and a shaft (12) of a motor (15), and a run up device (20) for imparting torque to the inertia wheel without substantially affecting the starting time of the motor (15), the device being mountable on a driving end of the shaft (12) of the motor opposite to the end of the shaft which is couplable to mechanical equipment to be driven by the motor (15).

The device, provides a driving system for the motor shaft that is particularly simple, efficient and economical during the transient disconnection of the said motor by substitution of the kinetic energy from the inertia wheel.

As a matter of fact, during a transient disconnection of the electrical supply of the motor, the unidirectional clutch which may comprise free wheel or a free wheeling clutch allows a coupling of the free wheel to the motor shaft, automatically without external command, in order to maintain rotation of the motor. Then when the supply to the motor is back, the inertia wheel is taken off line which does not penalized the motor starting time.

The use of a free wheel placed between the inertia wheel and the motor shaft, allows, for a transfer from an electrical source to another one, a transient time particularly short, changeover time which ensures the continuity of the fuel supply to the combustion turbine.

In addition, with the run up device of the inertia wheel, it is not necessary to oversize the motor to allow for making the inertia wheel rotate.

As a matter of fact, the run up device is designed in such a way that it does not affect the starting time of the motor. In that respect, the run up device includes an hydraulic coupler, for example using oil, designed to keep the inertia wheel at rest when the motor is starting, and to transmit a torque to the inertia wheel only when the motor has reached its rated speed depending on the internal oil supply of the coupler.

The inertia of the wheel is designed to have a very low speed reduction of the shaft, for example 10 to 15% during the source transfer time. The small resulting pressure variation of the high pressure fuel does not resulting in a significant load variation, considering this variation is smooth and low enough to be compensated in practice by the fuel control loop of the turbine.

An advantage of the inertia wheel driving device is its ability to transmit a torque that is adjustable taken off the motor torque, ensuring therefore a progressive run up of the inertia wheel in order to put a limit to the motor overload during the run up of the inertia wheel. Doing so, the accumulation of the kinetic energy into the inertia wheel is spread over time for being available later during a supply disconnection. The torque supplied by the motor shaft is adjusted to avoid an excessive overload of the motor.

The driving mean or the run up device for the inertia wheel constitutes a coupling mean between the motor shaft and the inertia wheel capable of giving a limited and adjustable driving torque to ensure a progressive run up.

Preferably, an inertia torque from the inertia wheel takes the place of the rated torque of the motor in less than fifty milliseconds further to the free wheel blocking.

The device can include a primary hollow shaft for mounting it onto the motor shaft. The primary hollow shaft thus constitutes a mounting sleeve for the device on the said shaft.

Favorably, the device can also include a secondary shaft radialy placed around the primary hollow shaft and on which is mounted the inertia wheel. The free wheel can be mounted radialy between the primary hollow shaft and the secondary shaft.

Preferably, the inertia wheel includes a hub, a rim, and a web connecting the rim to the hub. Favorably, the web can include vanes capable of creating an air flow when the inertia wheel is rotating and able to ensure the ventilation of the motor when the device is mounted at the place of the cooling fan of the said motor. The rim of the inertia wheel can be used to channel the generated air flow toward the motor casing in order to cool it down.

The driving device can be mounted overhanging on the motor shaft at the place of the cooling fan generally associated to the motor, without specific bearings, and allows through the web vanes the generation of a cooling air flow which is channeled by the rim. This arrangement does not need much more room than a standard motor, which is of a nature to ease upgrade or retrofitting of existing installations.

In another possible arrangement, a fuel supply pump includes a motor, a shaft, and a driving device of the said shaft as described previously.

The present invention also provides a use of the above described device in a combustion turbine for driving a liquid fuel supply In another possible arrangement, a combustion turbine includes several fuel supply pumps each having its own motor, shaft, and a driving device of the said shaft as described previously.

The present invention also provides a method of driving a motor, comprising the steps of providing a unidirectional automatic clutch which engages on torque reversal between an inertia wheel and the motor progressively accelerating an inertia wheel when the rated speed of the motor is reached, and driving the motor shaft using the inertia wheel in the event of failure of the said motor.

BRIEF DESCRIPTION OF THE DRAWING

There follows, by way of example, a detailed description of an embodiment of the invention with reference to the accompanying drawings in which the FIGURE shows schematically a cut away section of a device embodying the present invention.

DETAILED DESCRIPTION OF THE INVENTION

In the FIGURE is shown schematically the overall architecture of an embodiment as the invention, designated by the reference numeral tag 10, and designed for driving the shaft 12, around an axis 14 considered horizontal of a motor 15. The shaft 12 is overhanging on both sides of the motor casing.

More accurately, the device 10 is allows for driving the shaft 12, following a transient failure of the electrical supply of the motor 15. The motor 15 is designed to drive a fuel pump (not shown). The coupling of this pump is made using one side of the shaft 12 opposite to the side on which is mounted the device 10, when considering the motor 15.

The device is particularly suitable to drive a fuel supply pump of a combustion turbine used for producing energy or for driving gas compressors.

However, it can be easily imagined that the device 10 could be used for driving other mechanical equipments.

The device 10 includes as major parts an inertia wheel 16, a free wheel 18 placed between the said inertia wheel and the shaft 12, and a device 20 to put the inertia wheel on speed.

As described in more detail below, the free wheel 18 allows for a unidirectional clutch between the inertia wheel 16 and the shaft 12.

To allow for its mounting on the shaft 12, the device 10 includes a primary hollow shaft 22 with the same axis as the shaft 12. This primary shaft 22 ensures the link between the shaft 12 and the run up device 20. To do so, the primary shaft 22 suits on one side the motor shaft 12 end diameter with its internal bore 24, and on the other side the run up device 20 by a part 26 of a reduced diameter. The primary hollow shaft 22 can be coupled to the shaft using any appropriate means, for example a key.

The device 10 includes also a secondary shaft 30 for mounting the inertia wheel 16. The secondary shaft 30 is designed as hollow shaft of the axis 14 outside and around the primary shaft 22. The secondary shaft 30 is linked on one side to the run up device 20. The run up device 20 comprises a coupling between the motor shaft and the inertia wheel, which can be engaged at a desired time to gradually impart rotation to the inertia wheel.

To allow for a unidirectional rotation of the secondary shaft 30 and the primary shaft 22, the device 10 includes a ball bearing of axis 14, and the free wheel 18 placed radialy between the primary shaft 22 and the secondary shaft 30. The ball bearing 38, here schematically shown, is of a commercial type and is mounted axially between the free wheel 18 and the motor 15.

The free wheel 18 is mounted axially close to the ball bearing 38. The free wheel 18 is shown schematically in the FIGURE. It includes a number of blocking elements or cams placed between the shafts 22 and 30, and a circular cage to house these cams. The cams are profiled to tilt in direction of the driving torque and buttress between the shafts 22 and 30 in the other direction.

In other words, the cams are profiled to allow, for operation of the free wheel 18, an unclutched situation for which no torque is transmitted between the inertia wheel 16 and the shaft 12, for such a condition of operation, the shafts 22 and 30 constitute a rolling track for the cams of the free wheel 18.

An axial retaining ring 40 of circlips type, is mounted into the bore 32 of the hollow shaft 30 in order to retain axially the free wheel 18 and the ball bearing 38 inside the axial cavity between the primary shaft 22 and the secondary shaft 30.

The inertia wheel 16, of axis 14, includes a hub 42, a rim 44 shaped as an outer ring extended axially to partly cover the motor body 15, and a web 46 linking the rim to the hub. The inertia wheel 16 is axially positioned between the run up device 20 and the motor 15. The hub 42 is mounted on the outer surface of the secondary shaft 30, by any appropriate mean, here a key 48. The hub 42 is of an annular shape centered around the axis 14. The web 46 between the hub 42 and the rim 44 allows for the torque transmission to put on speed the inertia wheel in a direction of rotation, and an inertia torque from the rim 44 in the opposite direction of rotation, the said rim providing the best part of the energy of the inertia wheel 16.

The web 46 is fitted with vanes 50 shown schematically or is integral with these vanes, to generate an air flow directed toward the motor 15 to ensure its cooling. The inertia wheel 16, and more particularly the web 46 so constitutes a mean of generation of a cooling air flow illustrated by the arrows 52 and 54 that allows the inertia wheel 16 to take the place of the original cooling fan of the motor 15. The rim 44 allows the generated cooling air flow to be directed toward the motor 15.

The run up device 20 of the inertia wheel overhangs on the primary and secondary shafts 22, 30 and is coupled to both shafts. The run up device 20 is designed to deliver a limited driving torque to the inertia wheel 16 to ensure a progressive run up from a torque taken off the shaft 12. This torque transmission is done trough the primary shaft 22 then the secondary shaft 30 which are linked by mean of a run up device 20. The said run up device 20 (shown schematically) is an hydraulic coupler.

The operating mode of the device 10 is the following.

Further to a start of the driving motor 15, the shaft 12 and the primary shaft 22 are driven in rotation. The secondary shaft 30 stays at rest due the presence of the free wheel 18 operating as an open clutch. Once the shaft 12 has reached its rated speed, the run up device 20 then generates a limited torque taken off the motor 15 to the secondary shaft 30 so that the inertia wheel 16 picks up speed progressively until its speed is closed to the speed of the said motor.

Doing so, the starting time of the motor 15 is not affected by the run up of the inertia wheel 16 as this run up is done after the motor has completed its starting phase. The progressive run up of the inertia wheel 16 needs only a limited torque compared to the capability of the driving motor 15, which does not require any over sizing or overloading.

In other words, the run up device 20 is not active as long as the rated speed of the motor 15 is not reached, and then becomes active in order to drive with an adjustable torque the inertia wheel.

During a transient disconnection of the power supply from the motor 15, the electrical torque vanishes and the resistive torque of the pump tend to slow down the shaft 12. The cams of the free wheel tend to tilt automatically in a way that favours them blocking between the tracks of the shafts 22 and 30, which cause them blocking the free wheel. The free wheel 18 operates then as a closed clutch and can transmit the driving torque between the inertia wheel 16 and the shaft 12. The shaft 12 is thus driven by restitution of the kinetic energy accumulated previously into the inertia wheel 16 and so doing the vanished electrical torque is replaced. Of course, it can be easily understood that the inertia of the wheel 16 is a function of the power required by the driven equipment and of the speed reduction acceptable by it, and of the disconnection duration for the transfer from an electrical source to another one.

Once the transfer from a source to another one is done, the motor 15 is then supplied again with electrical power, which cause a re-acceleration of the shaft 12 and the release of the cams of the free wheel 18. The free wheel 18 operates then again as an open clutch. In a similar manner as during the motor start, the run up device 20 is going to run up again the inertia wheel to compensate for the speed loss, so becoming ready to back up the motor in case of a new disconnection from the electrical supply.

A driving device is this provided that is capable of providing back up reliably, economically, and within a limited space during a transient failure of the power source in order to ensure a transient period of driving of an equipment.

Although the arrangement illustrated shows the secondary shaft 30 and the inertia wheel 16 are two independent pieces, it can be imagined, within the coverage of this invention, an arrangement in which the inertia wheel 16 and the shaft 30 are made as a single piece.

The invention claimed is:

1. A device for back up driving of a motor, comprising;
   an inertia wheel;
   a unidirectional clutch that is automatically engagable in an event of reverse torque between the inertia wheel and a shaft of a motor; and
   a run up device for imparting a torque to the inertia wheel, wherein the run up device is configured to not transmit any torque to the inertial wheel during a motor starting phase;
   wherein the device for back up driving of the motor is mountable on a driving end of the shaft of the motor opposite to the end of the shaft that is couplable to mechanical equipment to be driven by the motor.

2. The device of claim 1, wherein the run up device is configured to transmit a driving torque once a rated speed of the motor is reached.

3. The device of claim 1, wherein the run up device is configured to provide a progressive run up of the inertia wheel.

4. The device of claim 1, wherein the nm up device is configured to transmit an adjustable torque taken off the shaft in order to limit overload of the motor during the run up period of the inertia wheel.

5. The device of claim 1, such that an inertia wheel torque takes a place of a rated motor torque in less than fifty milliseconds when the unidirectional clutch is engaged.

6. The device of claim 1, further including a primary hollow shaft fir mounting the assembly on to as motor shaft.

7. The device of claim 6, further including a hollow secondary shaft placed around the primary hollow shaft, the inertia wheel being mounted on the secondary shaft.

8. The device of claim 1, wherein the inertia wheel includes a hub and a rim interconnected by a web.

9. The device of claim 8, Wherein the web includes vanes able to generate an air flow when the inertia wheel is turning in order to allow the inertia wheel to take the place of a cooling air fan of the motor.

10. The device of claim 9, wherein the rim of the inertia wheel channels the generated air flow toward the motor in order to ensure its cooling.

11. The device of claim 1, wherein the unidirectional clutch comprises a free wheeling clutch.

12. The device of claim 1, wherein the device is located in a combustion turbine for driving a liquid fuel supply pump.

13. A method of driving a motor, comprising the steps of;
providing a unidirectional automatic clutch that engages on torque reversal between an inertia wheel and the motor;
providing a run up device for imparting a torque to the inertia wheel, wherein the run up device is configured to not transmit any torque to the inertial wheel during a motor starting phase;
progressively accelerating an inertia wheel when a rated speed of the motor is reached; and
driving the motor shaft using the inertia wheel in the event of a failure of the said motor.

* * * * *